United States Patent [19]
DiMattei

[11] Patent Number: 5,517,199
[45] Date of Patent: May 14, 1996

[54] EMERGENCY LOCATOR DEVICE

[75] Inventor: John J. DiMattei, Rosemount, Minn.

[73] Assignee: Aerodata Corporation, Massapequa, N.Y.

[21] Appl. No.: 439,482

[22] Filed: May 11, 1995

[51] Int. Cl.⁶ .............................. H04B 7/185; G01S 5/02
[52] U.S. Cl. ......................................................... 342/357
[58] Field of Search .............................. 342/357; 441/80, 441/89

[56] References Cited

U.S. PATENT DOCUMENTS

| | | | |
|---|---|---|---|
| 5,218,366 | 6/1993 | Cardamone et al. | 342/385 |
| 5,355,140 | 10/1994 | Slavin et al. | 342/386 |
| 5,367,306 | 11/1994 | Hollon et al. | 342/386 |
| 5,392,052 | 2/1995 | Eberwine | 342/357 |
| 5,408,238 | 4/1995 | Smith | 342/357 |
| 5,414,432 | 5/1995 | Penny, Jr. et al. | 342/357 |

*Primary Examiner*—Theodore M. Blum
*Attorney, Agent, or Firm*—Hoffman & Baron

[57] ABSTRACT

An emergency locator device which is adapted to receive information signals from global positioning satellites (GPS) and determine a position of the device in terms of latitude and longitude includes a downlink antenna to receive GPS position information, a receiver/processor for processing the GPS information, a microcontroller for controlling the operation of the device, a transceiver and an uplink antenna to establish a communications link with a telecommunications satellite and transmit a rescue signal from the emergency locator device to rescue authorities.

19 Claims, 14 Drawing Sheets

EMERGENCY LOCATOR DEVICE

BACKGROUND OF THE INVENTION

1. Field of the Invention

The present invention relates to discovery and location systems, and more particularly relates to a location device which uses orbiting global positioning satellites (GPS) to determine a location and which is capable of transmitting a location (longitude and latitude) to search and rescue authorities.

2. Description of the Prior Art

In the United States, the U.S. Air Force Rescue Coordination Center (AFRCC) is responsible for coordinating search and rescue efforts. An activities report, issued by the AFRCC, indicates that a major problem in rescue missions was the high rate of false signals transmitted by Emergency Locator Transmitters (ELTs) used to locate aircraft and marine vessels in distress. Due to the high rate of false signals, search and rescue authorities may not be immediately dispatched upon receipt of a distress signal unless substantial additional evidence exists to confirm the emergency. This delayed reaction could mean life or death to those stranded in severe conditions on land or water.

Thus, there is a need for a device that can quickly and reliably determine its location and relay that information to search and rescue authorities. The device must be able to utilize existing satellite services available to the general public. Various prior art systems have been developed to send a tracking signal to a receiving station, each having disadvantages as discussed below.

For example, U.S. Pat. No. 3,063,048 to Lehan, et al. discloses a system that utilizes an orbiting satellite to discover and determine the location of an object whose position on the earth's surface is unknown. The disclosed system utilizes a Doppler frequency shift algorithm to determine the object's position. The system as disclosed is outdated, impractical and expensive to implement. Furthermore, this type of system is inaccurate compared to presently available location determination systems.

U.S. Pat. No. 5,223,844 to Mansell, et al. discloses a vehicle tracking and security system that utilizes GPS position signals. The vehicle unit includes a GPS receiver for determining a location of a vehicle. The vehicle unit also includes a controller, responsive to the satellite receiver, for transmitting information onto a communications link. The information includes an alarm event identification and the vehicle location. Although the patent states that this system is suitable for use in fleet vehicle management, vehicle theft deterrent, stolen vehicle tracking, railroad car tracking and so forth, the system is not designed to reliably transmit rescue signals or to be portable, nor is it designed for use in harsh environments such as at sea or in aircraft. Furthermore, the system is complex having many components mounted within a vehicle and cannot be carried by a person for use in an emergency situation involving an aircraft or a marine vessel.

U.S. Pat. No. 4,813,025 to Rowland et al. discloses a system for locating a person who has fallen overboard from a ship. The system utilizes both radio and ultrasonic signals to transmit distress signals to an ocean vessel having suitable receiving equipment. This type of system does not utilize global positioning satellites and is not capable of providing specific location information to a distant receiving rescue station. More specifically, the system is limited to transmitting a distress signal from a person in distress to a properly equipped vessel within a very close distance.

A location signalling device for automatically placing a radio distress call is described in U.S. Pat. No. 5,193,215 to Olmer, et al. The disclosed device receives positional data from either a manual keyboard input entered by the operator or by a special interface to external positioning equipment (i.e. LORAN or GPS receiver). The rescue signal is transmitted upon activation by the operator using a VHF/SSB radio transmitter that is also external to the device. The device is difficult to use in most emergency situations due to dependence on external devices to provide both positional data and signal transmission capability. More specifically, in emergency situations, crews abandoning a quickly sinking boat or aircraft may not have sufficient time to program the system with the correct information and begin transmission of the rescue signal. Furthermore, there is no total system operation verification to ensure that the GPS receiver and rescue message transmitter are operable. The rescue signal would be also restricted by the range limitations of the VHF/SSB radio frequencies. A rescue device for general aviation and marine use needs to be portable, reliable and not dependent on external devices to operate.

In the foregoing prior art disclosures, the systems described are generally costly, complicated to develop, not portable and are limited by the technology selected to relay the distress signal to search and rescue authorities. Thus, there is a need for an emergency locator system which is portable and combines the use of existing GPS and communications satellites for accurate, reliable, trouble-free transmission of rescue signals to the authorities to expedite rescue missions.

OBJECTS AND SUMMARY OF THE INVENTION

It is an object of the present invention to provide an emergency locator device for the transmission of accurate, reliable, trouble-free rescue signals to rescue authorities.

It is another object of the present invention to provide a portable, hand-held emergency locator device for use on aircraft and marine vessels for activation in distress situations.

It is a further object of the present invention to provide an emergency locator system which combines the use of existing GPS and communications satellites for accurate position determination and reliable transmission of distress signals.

It is yet a further object of the present invention to provide an emergency locator system which provides the operator with a visual indication that the device is working properly and that a distress signal has been transmitted.

It is yet a further object of the present invention to provide an emergency locator device which is relatively simple to manufacture and easy to use.

It is yet a another object of the present invention to provide an emergency locator device which includes a strobe light for providing visual indication of the device in low-ambient lighting conditions.

It is still another object of the present invention to provide an emergency locator device which includes buoyancy means for providing flotation capability to the device.

It is still a further object of the present invention to provide a portable, hand-held emergency locator device having an arrangement of a downlink antenna and an uplink antenna such that each is provided with unobstructed line-of-sight communications with satellites orbiting the earth.

In accordance with one form of the present invention, the emergency locator device is a portable, hand-held apparatus which includes a satellite receiver responsive to digital timing codes transmitted from global positioning satellites, a microcontroller coupled to the satellite receiver and a transceiver coupled to the microcontroller for establishing a communications link with a telecommunications satellite. The satellite receiver is capable of calculating a latitude and longitude location of the emergency locator device. The microcontroller coordinates all internal operational logic functions and stores rescue information including a unique identification number for the emergency locator device and the latitude and longitude information received from the satellite receiver. Upon establishing a communications link with a telecommunications satellite, the transceiver receives the rescue information from the microcontroller and transmits the rescue information to the telecommunications satellite for receipt by rescue authorities.

The emergency locator device includes an environmentally sealed housing or, alternatively, may be in the form of a housing having three independently sealed compartments, each compartment housing one of the three main sections of the emergency locator device—an antenna section, an electronics section and a power supply section. The antenna section includes a downlink antenna designed to receive information signals from global positioning satellites and an uplink antenna arrangement capable of establishing a communications link with a telecommunications satellite. The electronics section includes a main circuit board including means for determining a latitude and longitude of the emergency locator device in response to the received GPS information signals and means for transmitting the latitude and longitude information via the uplink antenna arrangement to a telecommunications satellite. The electronics section further includes display means for displaying status information to the operator. The power supply section includes an independent, self-contained power supply for providing power to the main circuit board.

The emergency locator device of the present invention may also include a strobe light for providing a visual indication of the emergency locator device in low-ambient lighting conditions. The emergency locator device may also include buoyancy means for providing flotation capability to the emergency locator. The buoyancy means makes the locator device self-righting to thereby maintain the downlink and uplink antennas above the surface of the water. The strobe light is preferably arranged at the top portion of the emergency locator device which floats above the water so that the strobe light can be readily seen by aircraft or surface vessels.

The emergency locator device includes activation means, such as a manual switch, to place the device into the active or transmitting mode. The activation means may further include a push-to-test switch so that the user may periodically test the proper operation of the emergency locator device.

The emergency locator device also includes voltage monitoring means to continuously monitor the power supply voltage or current when in both a passive mode and an active mode and provide an indication of low power. The low power indication may be visually shown on the display of the device as well as an audible indication. In this manner, the device can be easily maintained and always ready for use in emergency situations.

A preferred form of the emergency locator device, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

The present invention is an emergency locator device which determines position on earth by receiving and processing signals transmitted by a constellation of twenty-one Department of Defense (DOD) global positioning satellites (GPS) orbiting the earth. The position (in degrees longitude and latitude) and a unique identification number associated with each emergency locator device is relayed to rescue authorities by the device using a radio uplink to an orbiting telecommunications satellite.

Figure 1:
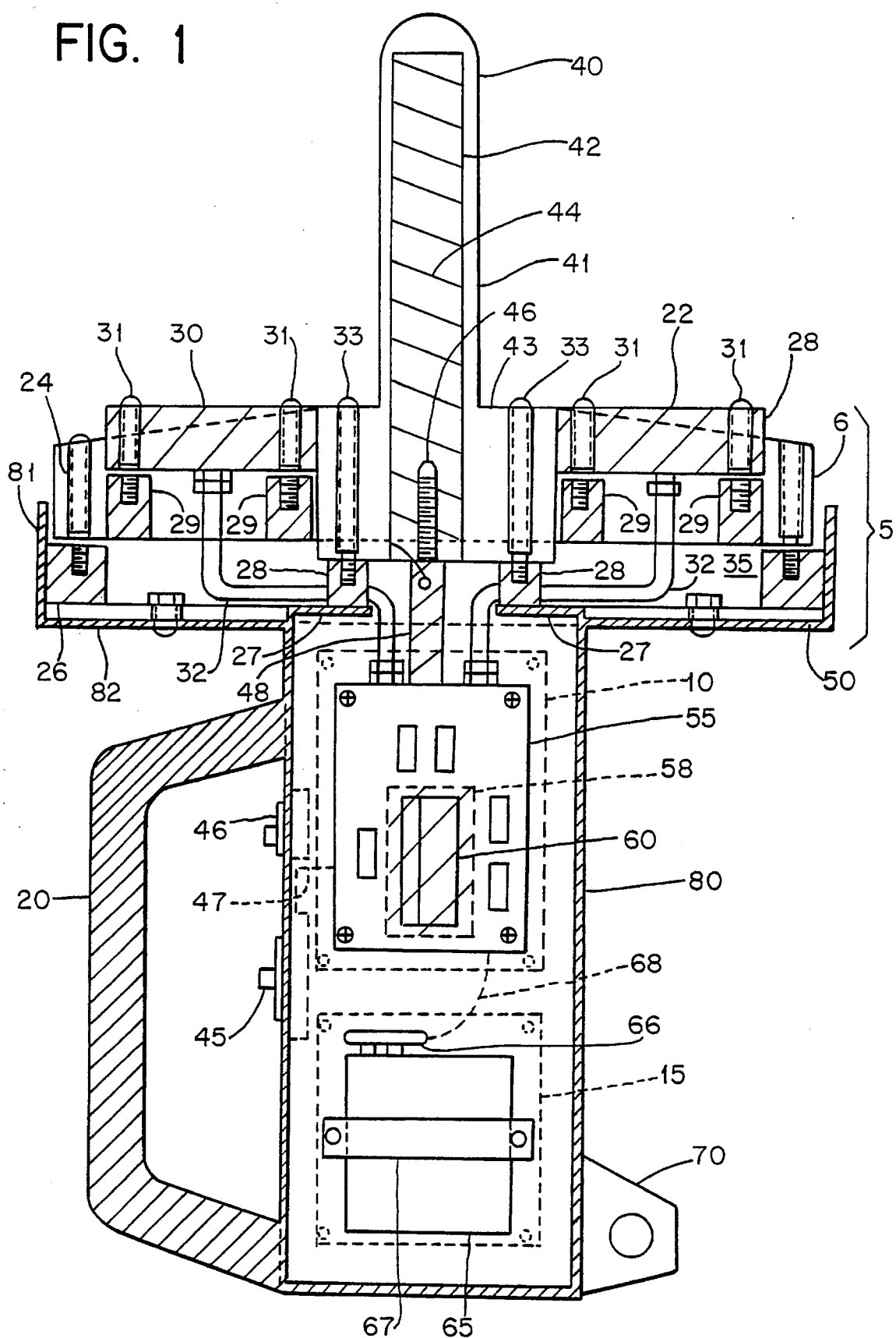
FIG. 1 is a longitudinal cross-sectional view in simplified form of the emergency locator device of the present invention.

Referring to FIG. 1, the emergency locator device, also referred to as GPS Emergency Locator Transmitter (GPSELT), is a hand-held, portable device. The emergency locator device of the present invention preferably comprises three primary sections: a power supply section 15; an electronics section 10; and an antenna/buoyancy section 5. Each of these sections may be housed in individually environmentally sealed compartments forming portions of a main housing to keep external moisture from damaging the internal electronic circuits. In the embodiment shown in FIG. 1, the emergency locator device comprises a main housing 80 which is environmentally sealed and which contains the power supply section 15 and the electronics section 10 and which may extend upward toward the top portion of the emergency locator device to at least partially receive the antenna/buoyancy section 5 and be environmentally sealed therewith.

More specifically, the housing 80 extends upwardly from its lower portion (in which the battery section 15 is preferably mounted) to an enlarged diameter, circular upper portion having a side wall 81 joined to and extending upwardly from a bottom wall 82. The upper portion of the housing 80 has mounted to its bottom wall 82 a metal plate-like disk 50 which acts as the ground plane for a microwave satellite uplink transmitting antenna 40, as will be described in greater detail.

The antenna/buoyancy section 5 includes an antenna mounting form 6 which may be made from various materials, including styrofoam to provide buoyancy for the emergency locator device. The form 6 supports a GPS downlink receiving antenna 30 and an uplink microwave communications satellite receiving antenna 22. The two receiving antennas 22 and 30 are mounted diametrically opposite one another on opposite sides of the transmitting antenna 40, and the uplink transmitting antenna is mounted centrally through the form 6.

Figure 6:
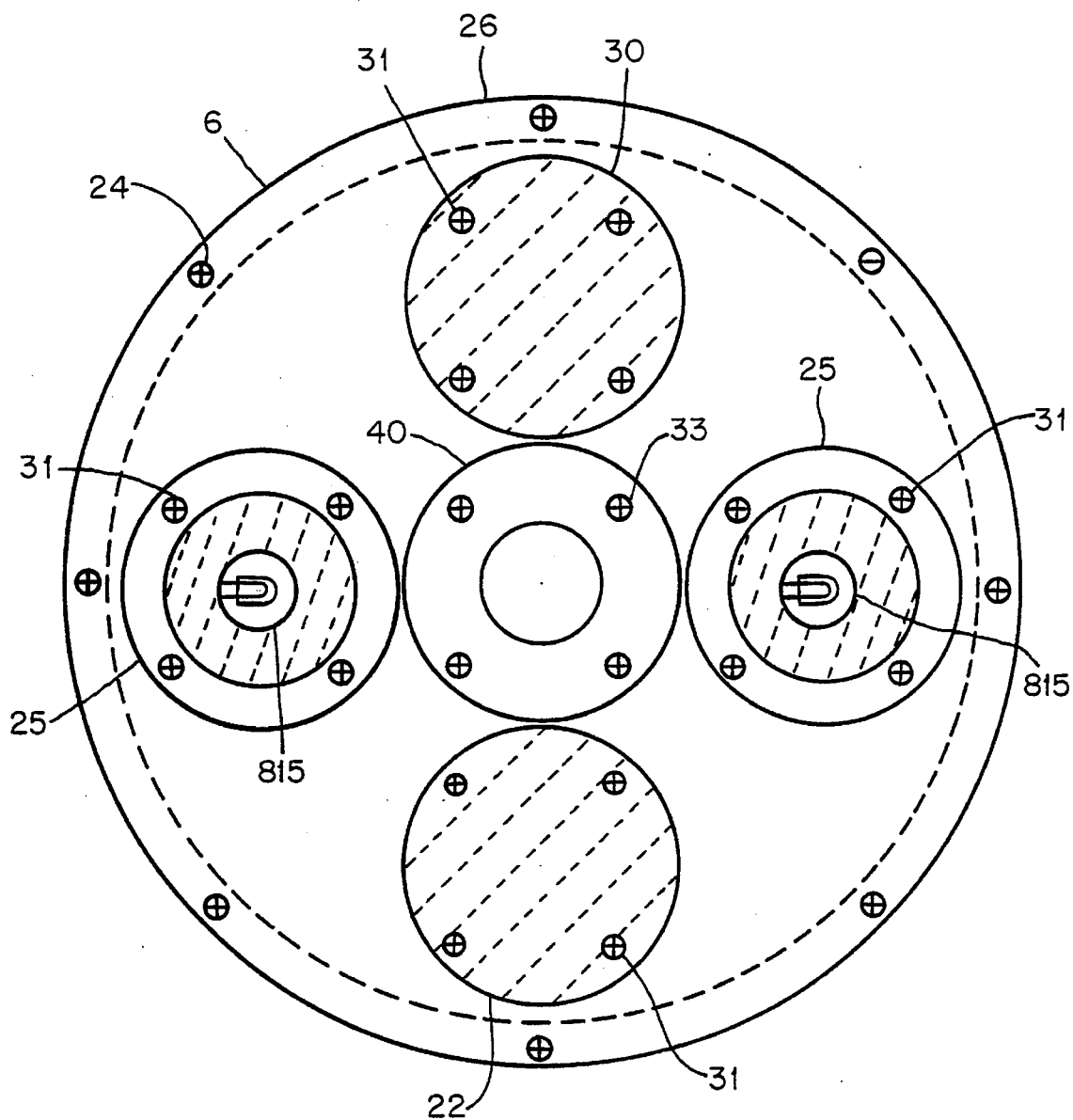
FIG. 6 is a top plan view, partially in transverse cross section, of the emergency locator device of the present invention.

The upper surface of the form 6 may be sloped downwardly from its center to its circumferential edge. This shape provides the uplink antenna 40 with an unobstructed line-of-sight for communicating with a satellite. As will be described in greater detail, the form 6 also supports a pair of diametrically opposed strobe light assemblies 25 (FIG. 6).

The form 6 is secured in an environmentally sealed and watertight manner to an outer circular ring 26 mounted in the corner formed by the side wall 81 and bottom wall 82 of the housing. This ring 26 acts a rim or shoulder for securing the antenna form 6 in place in the housing using screws or other fasteners 24. When the form 6 is secured to the outer circular ring 26 of the housing, it encapsulates air within the housing and thus forms a buoyancy chamber 35. Alternatively, buoyancy chamber 35 may be filled with styrofoam or other buoyant material to provide the emergency locator device with greater buoyancy.

An inner circular ring 28, which is placed concentrically inside the outer circular ring 26, is secured to a ledge 27 of the housing which protrudes radially inwardly at about the height of the bottom wall 82. Inner circular ring 28 supports the base of the microwave satellite uplink antenna 40 using screws 33 in a watertight and environmentally sealed manner such that no water may enter the interior of the housing 80.

The base 43 of the microwave satellite uplink transmitting antenna 40 is circular and is closely received by a central opening formed through the thickness of the antenna form 6 to provide a watertight engagement with form 6 in order to prevent water or other environmental elements from entering buoyancy chamber 35.

Figure 5:
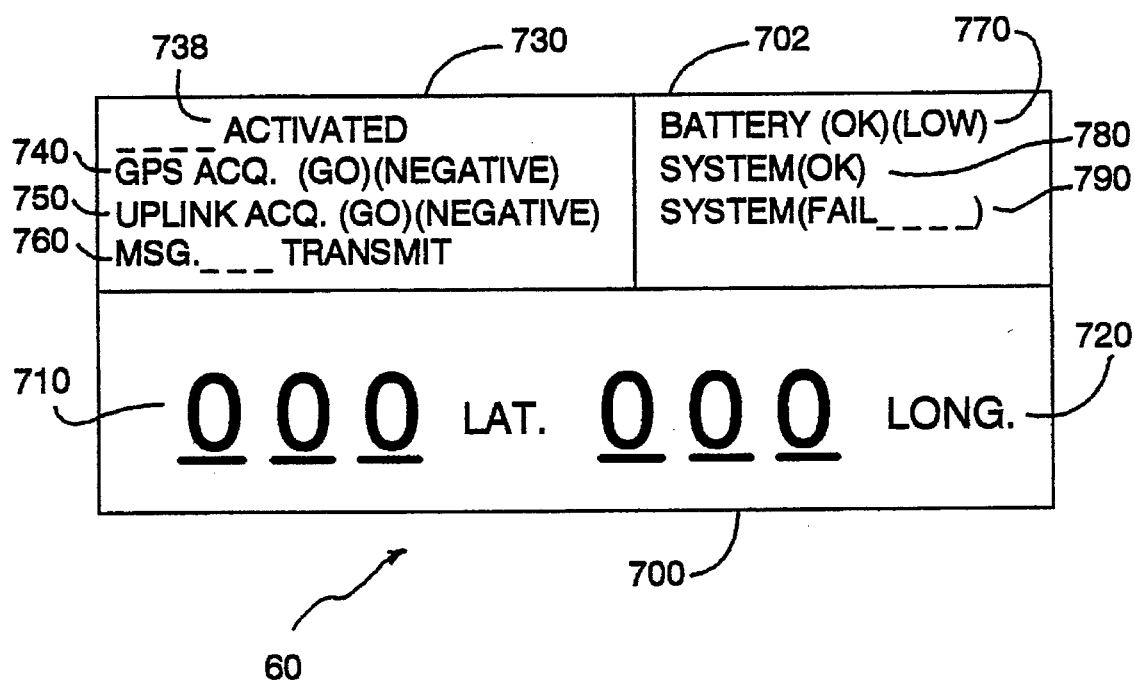
FIG. 5 is a front view of a display module designed for use in accordance with the emergency locator device of the present invention.

The microwave satellite uplink transmitting antenna 40 is shown in a simplified manner in FIG. 5. It is preferably a helical (axial-mode helix) antenna formed from nickel-plated copper ribbon material 44 which is helically wrapped about the circumference of a boom tube 42 formed of a non-conducting material, such as polyvinyl chloride (PVC). The helical antenna 40 is enclosed within its own protective housing or radome 41 having a lower portion base 43, as mentioned previously. The boom tube 42 is secured to the protective housing 41 using a screw or other fastener 46. An uplink antenna RF waveguide 48 connects the uplink transmitting antenna 40 to the electronic circuitry in the electronics section 10.

As will be described in greater detail, the microwave satellite uplink receiving antenna 22 and GPS receiving antenna 30 are also received at least partially in circular openings formed in the antenna form 6 and are connected to the electronics section 10 by antenna RF connection cables 32.

The housing 80 also preferably includes a handle 20 formed integrally with the housing for ease in carrying the device. Mounted on the housing under the handle 20 is a slide switch 45 which is used to activate the emergency locator device. The switch 45 is a multi-positionable slide switch which is also preferably used to selectively activate the strobe light circuit, and may be also used to activate the push-to-test circuit, as will be described in greater detail, although in the embodiment shown in FIG. 1 a separate PTT switch 46 is used. The switch 45 is shown in FIG. 1 to be connected to the main circuit board 55 in the electronics section 10 via electrical conduit 47.

As shown in FIG. 1, the battery section 15 basically includes one or more rechargeable batteries 65 secured in place within the housing by bracket 67 and connected to the electronic circuitry of the emergency locator device using battery electrical connector 66 and power conduit 68.

It should be noted that the battery 65 and battery section 15 are located in the lowermost section of the housing 80. This provides the emergency locator device with a low center of gravity and thus stability when the locator device is floating in the water so that the uplink and downlink antennas 22, 30 and 40 are directed skyward.

A window having a transparent plastic or glass covering 58 is formed through the housing and is aligned with a liquid crystal display 60 mounted on the printed circuit board 55 of the electronics section 10 so that any information presented on the display may be viewed by the operator through the transparent covering 58 of the window of the environmentally sealed housing 80.

The downlink antenna 30 is used for receiving global positioning satellite (GPS) information. One of several antennas may be used, such as Part No. S67-1575-47 manufactured by Sensor Systems Inc. of Chatsworth, Calif., or Part No. 90LL12100-1 manufactured by MicroPulse of Camarillo, Calif.. The uplink microwave satellite receiving antenna 22 is used as a C-band receiving antenna for receiving signals from a telecommunications satellite and may be the same or a similar antenna to the GPS receiving antenna 30 described previously. The helical microwave satellite uplink transmitting antenna 40, in conjunction with the uplink receiving antenna 22, is used for establishing communications with a telecommunications satellite.

As shown in FIG. 1, all three uplink and downlink antennas 22, 30, 40 are directed skyward and protrude from the antenna mounting form 6. This arrangement provides an unobstructed line-of-sight for communication with both GPS and telecommunications satellites by the downlink and uplink antennas.

The emergency locator device of the present invention further includes a flange 70 protruding from the exterior of the housing 80 and having a hole formed through its thickness. The flange 70 serves as an attachment point to facilitate attachment of a line or rope. The line may be attached to a person, vehicle or vessel to keep the device within a moderate distance of a person or vessel in distress.

As mentioned previously, the emergency locator device of the present invention includes an independent (self-contained) power supply to allow the device to be portable. Electric power is preferably supplied to the device using one or more rechargeable batteries 65 positioned within the power supply compartment 15. The batteries supply power to all of the electronic circuits of the device.

As also mentioned previously, the electronics section 10 of the present invention includes a main circuit board 55 and a display module 60. Electronic components forming the processing and communications circuits of the present invention are located on the main circuit board 55. The electronic components forming the invention will be described in greater detail below with reference to FIGS. 2 and 4A–C.

Figure 2:
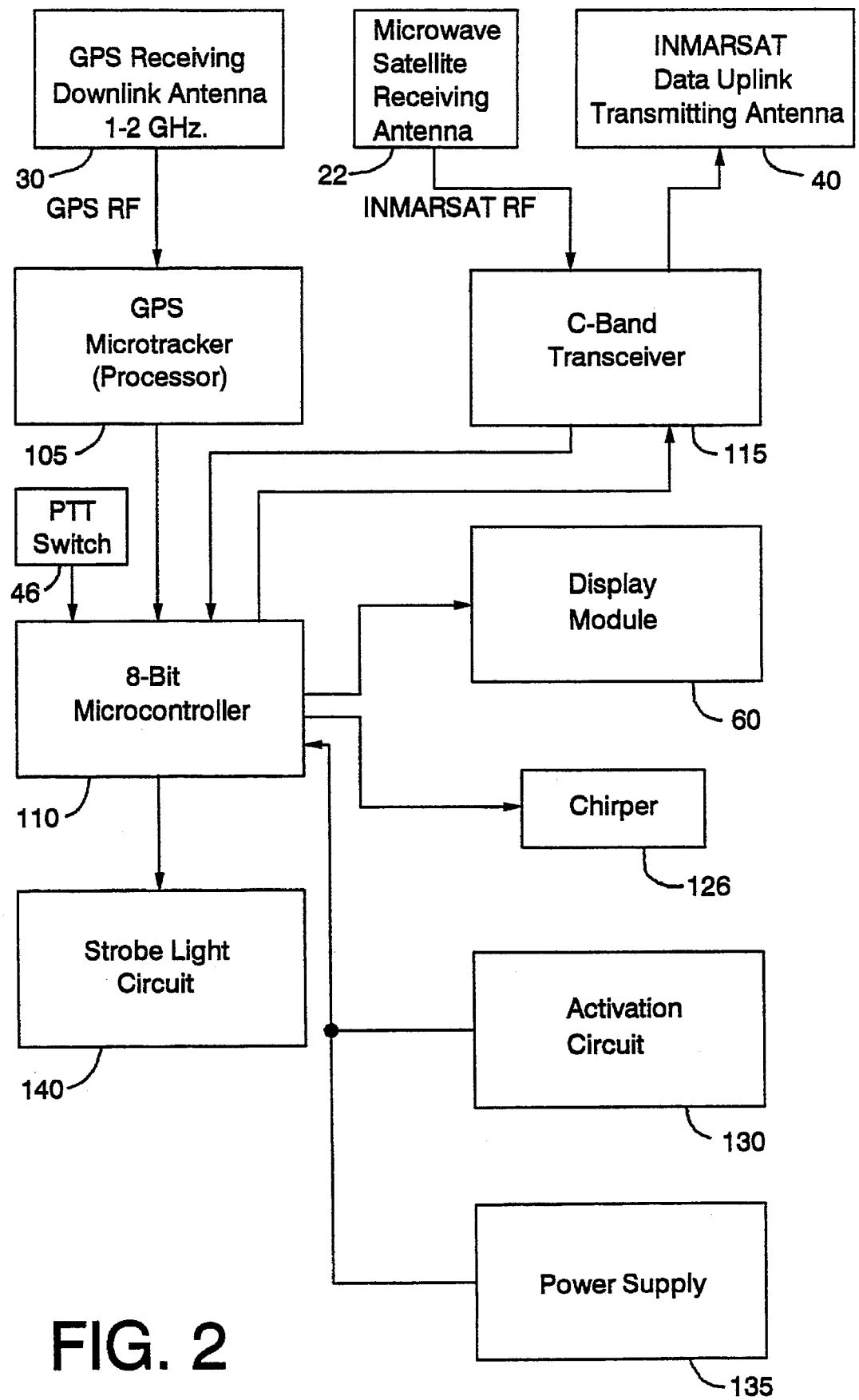
FIG. 2 is a block diagram which schematically illustrates the interconnection of the various components of the emergency locator device of the present invention.
Figure 3A:
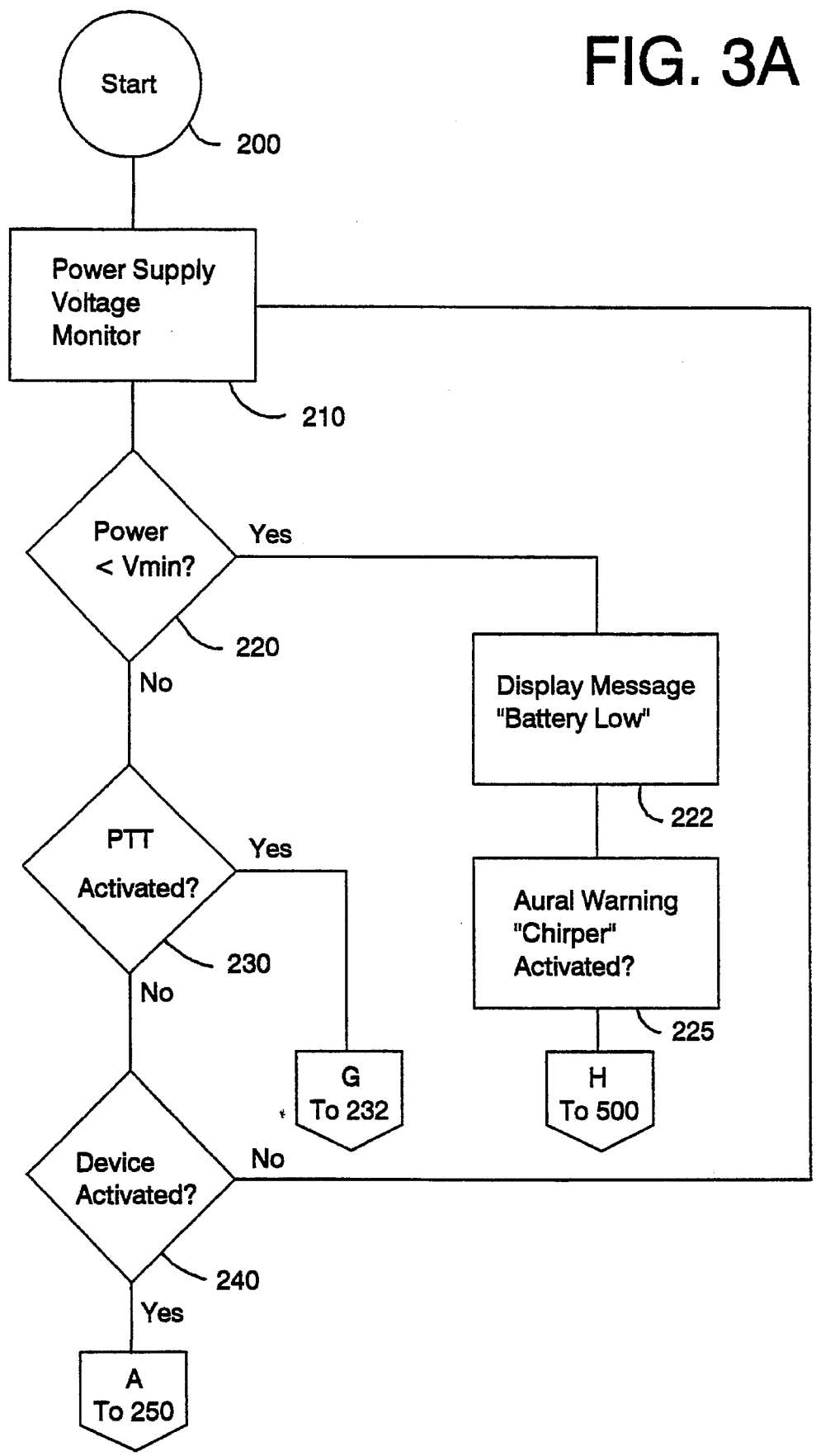
FIGS. 3A, 3B, 3C, 3D, 3E and 3F are portions of a flow chart of the operation of the emergency locator device of the present invention.
Figure 3B:
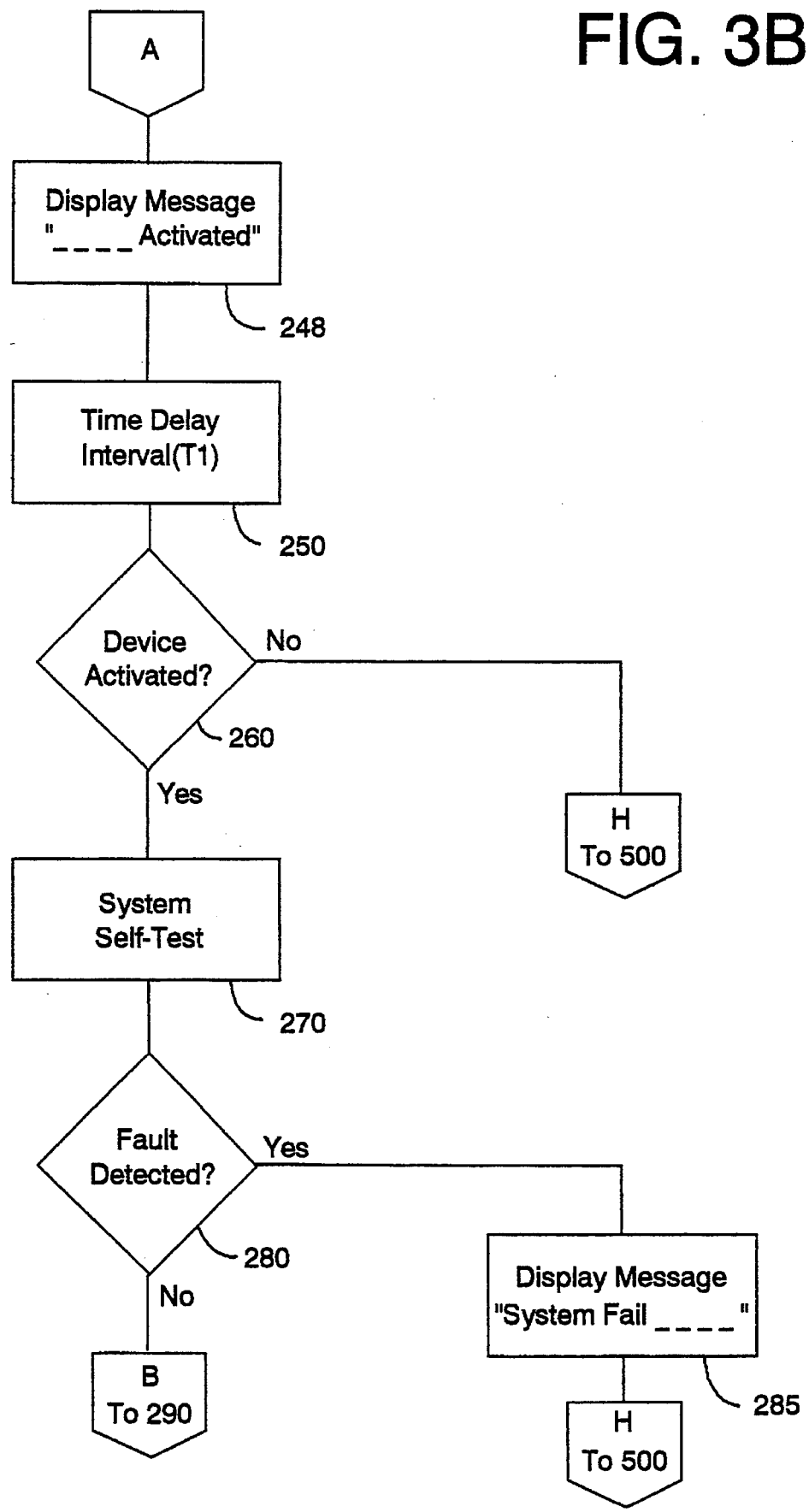
Figure 3C:
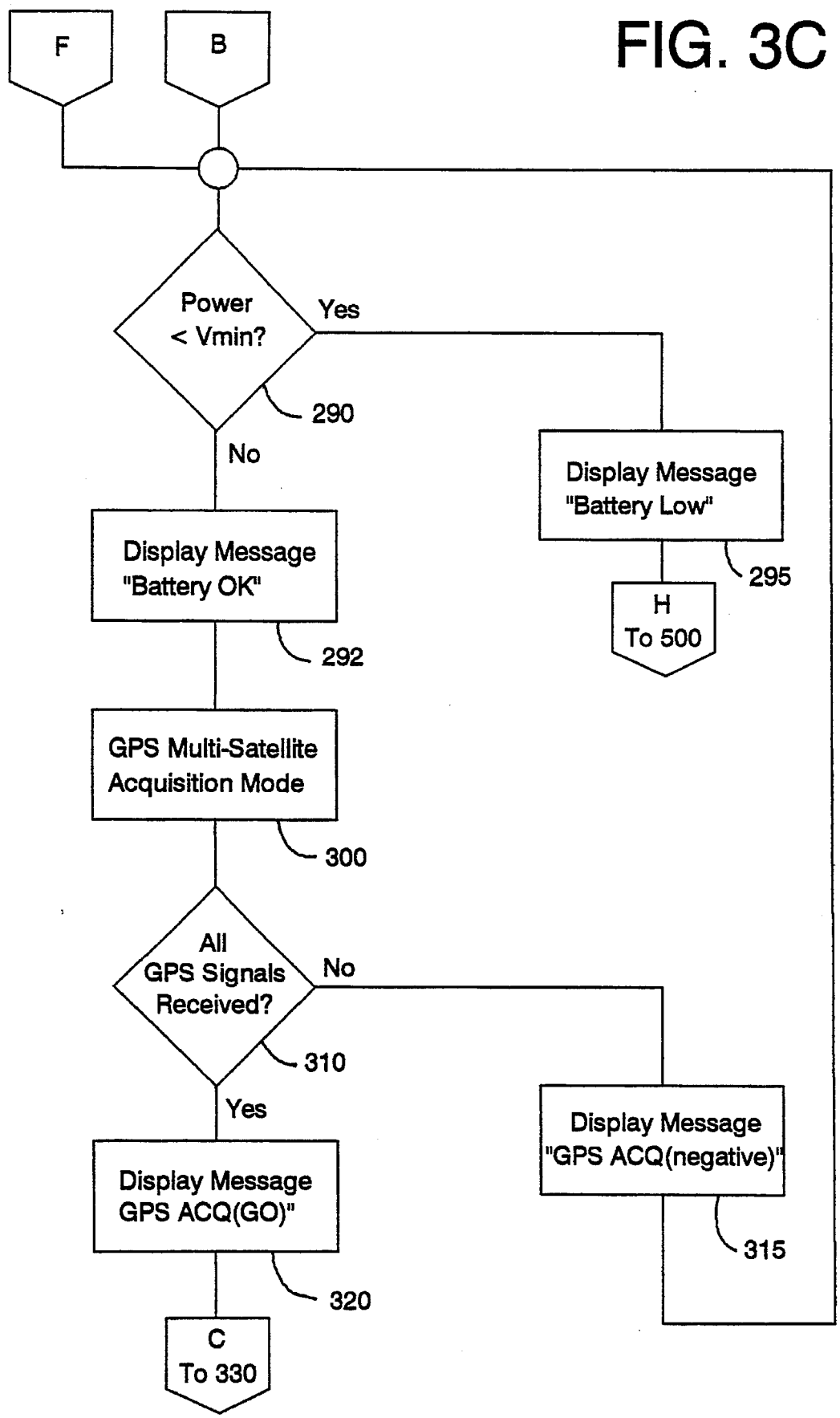
Figure 3D:
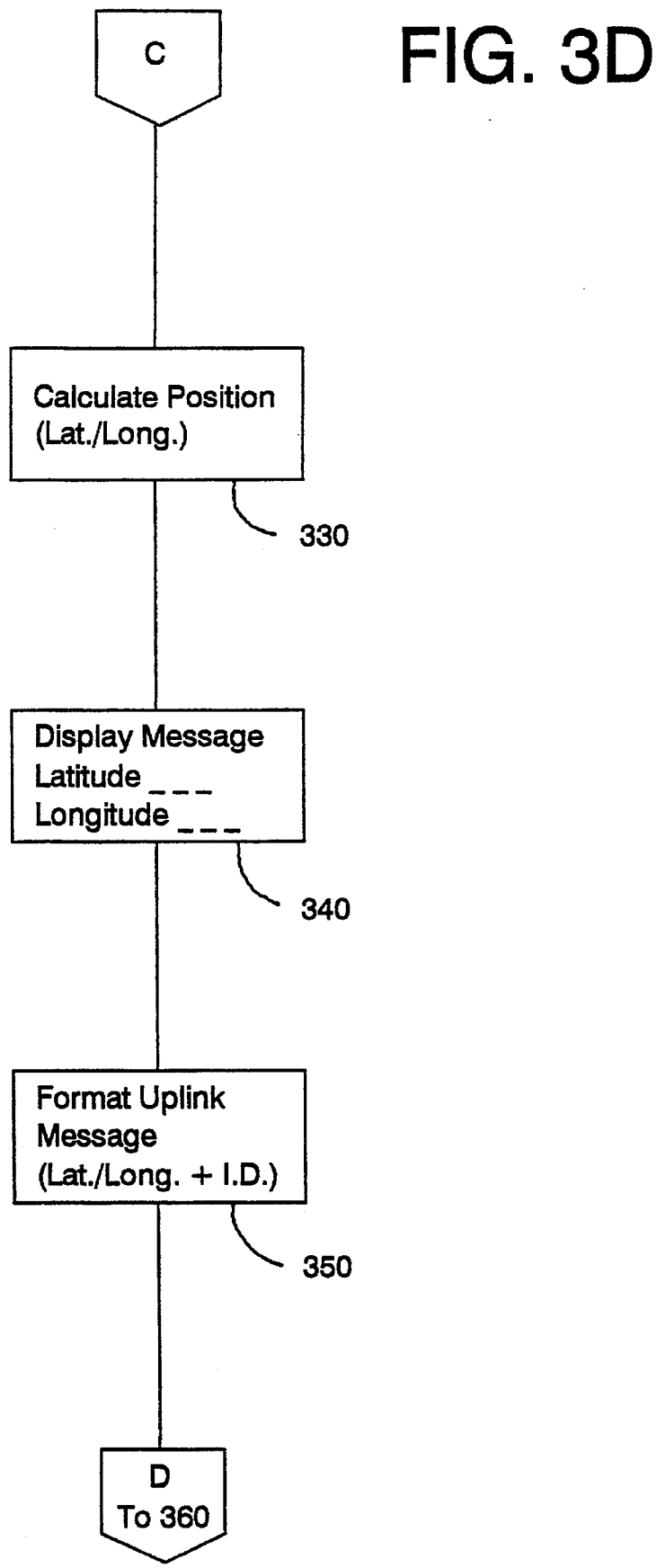
Figure 3E:
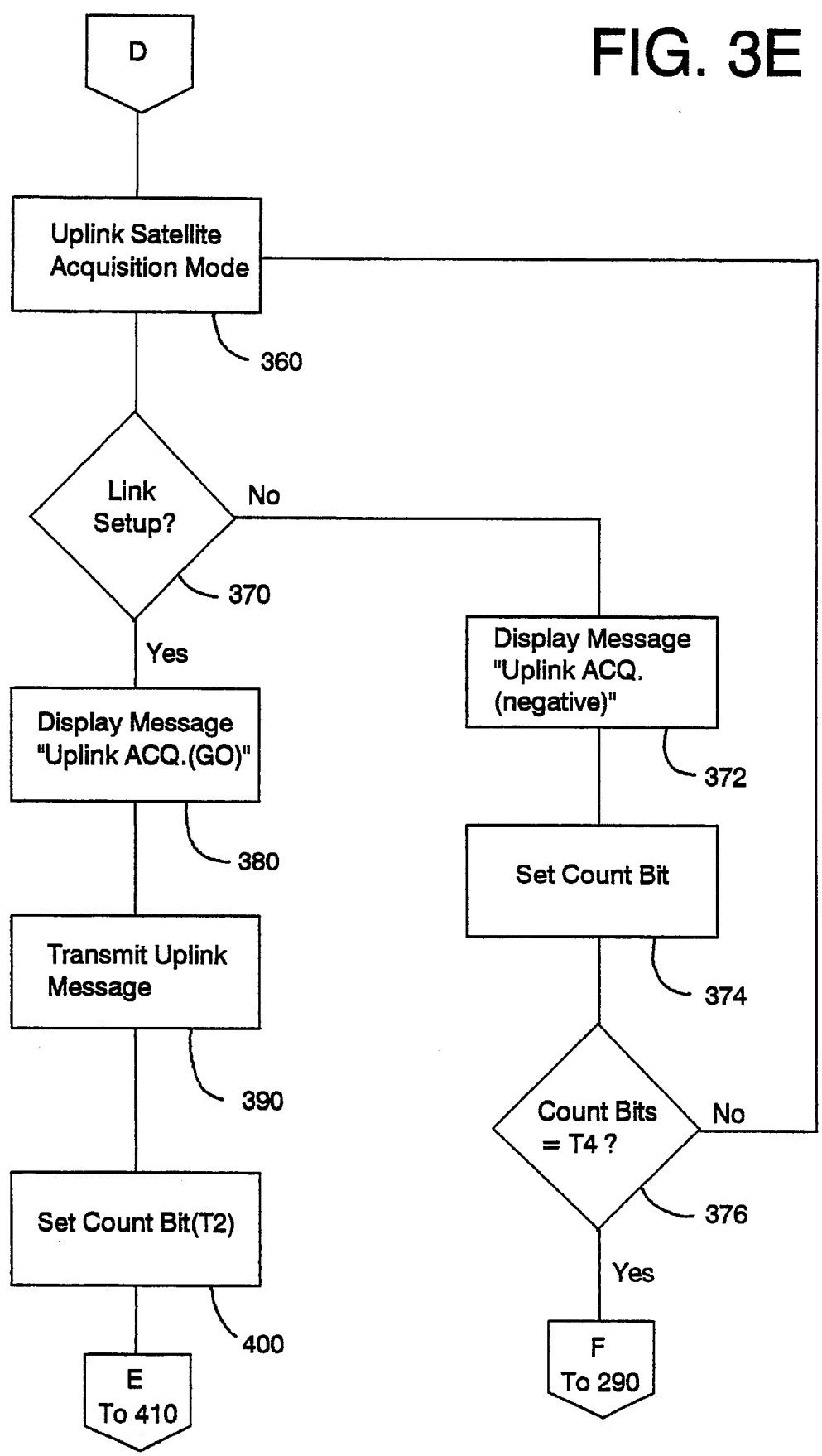
Figure 3F:
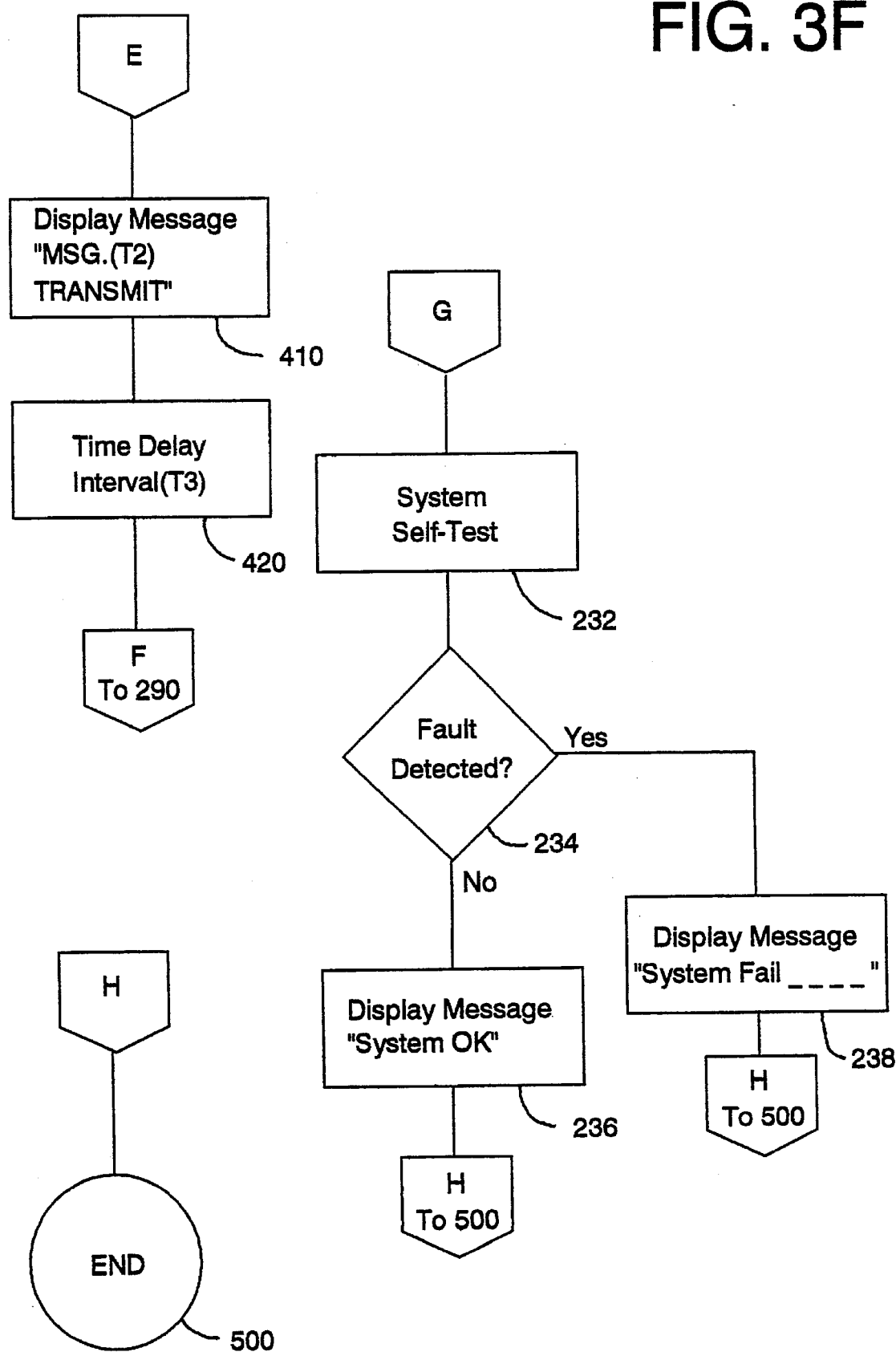

FIG. 2 is a block diagram which schematically illustrates the various components and operation of the electronic circuit of the present invention. Upon activation by the activation circuit 130 (such as the manual switch 45 shown in FIG. 1), the power supply 135 provides voltage to the electronic components on the main circuit board, which voltage is controlled by a microcontroller 110.

Upon activation of the emergency locator device, GPS "pseudo-random" timing signals are received by the downlink antenna 30 located on top of the housing to provide an unobstructed line-of-sight to the GPS satellites. The received GPS timing signals are routed to a GPS microtracker receiver/processor 105 which is connected to the main circuit board 55. The GPS microtracker calculates the position of the emergency locator in terms of degrees of latitude and longitude using the received GPS signals.

More specifically, both the GPS satellite and the GPS microtracker receiver/processor 105 of the present invention generate a set of synchronized digital pulses, called "pseudo-random" codes. The pseudo-random code patterns have sequences that repeat every millisecond. For timing purposes, it is important to note that the GPS satellites and the emergency locator device of the present invention generate the same code at exactly the same time. The microtracker receiver/processor 105 receives the code from the GPS satellite and then determines the time that the emergency locator device generated the same code sequence. The time difference is how long the signal took to travel from the satellite to the receiver. By using the equation S×T=D (Speed of radio waves×Time=Distance), the distance from each satellite to the receiver is calculated. The GPS microtracker receiver/processor 105 can then determine latitude and longitude of the device by triangulating the distances of the GPS satellites from the emergency locator device. The points at which the various GPS satellite signals overlap are used to pinpoint the exact location of the device. The position information is then formatted by the microtracker receiver/processor 105 into a digital communications message. The message is then sent digitally to a microcontroller 110. The microcontroller 110 provides the longitude and latitude information to the device operator by means of a display module 60 which is located for viewing through the emergency locator device housing 80. Additionally, satellite communication status and built-in test status messages are also preferably provided to the operator via the display module 60.

The microcontroller 110 is electrically coupled to both the GPS microtracker receiver/processor 105 and the transceiver 115. The microcontroller 110 includes a processor which coordinates the flow of logic data within the electrical components of the present invention. More specifically, position data calculated by the GPS microtracker receiver/processor 105 is received by the microcontroller 110 and is digitally formatted into an uplink rescue message. The uplink rescue message also includes a unique identification number of the emergency locator device which is stored in the microcontroller at the time the device is manufactured.

Before the uplink rescue message can be transmitted, a communications link must be established with an orbiting telecommunications satellite (e.g., INMARSAT, etc.). The uplink rescue message is temporarily held in memory circuits of the microcontroller 110 while communications are being established with the telecommunications satellite. To establish the communications link, the microcontroller 110 sends a series of digital commands to a C-band transceiver 115. Upon establishment of the communications link, the microcontroller 110 sends the stored uplink rescue message to the C-band transceiver 115 for transmission via a high frequency radio link to the orbiting satellite.

The emergency locator device includes an uplink antenna arrangement comprising microwave satellite receiving antenna 22 and data uplink transmitting antenna 40 coupled to the transceiver 115 to establish reliable radio communications between the device and the communications satellite. The uplink receiving antenna 22 receives RF signals from telecommunications satellites, which information is provided to transceiver 115. The transceiver ultimately establishes a communications link with the telecommunications satellites for transmitting a rescue message. The uplink antenna arrangement is preferably designed to operate in a radio frequency band of 1–2 GHz.

Figure 7A:
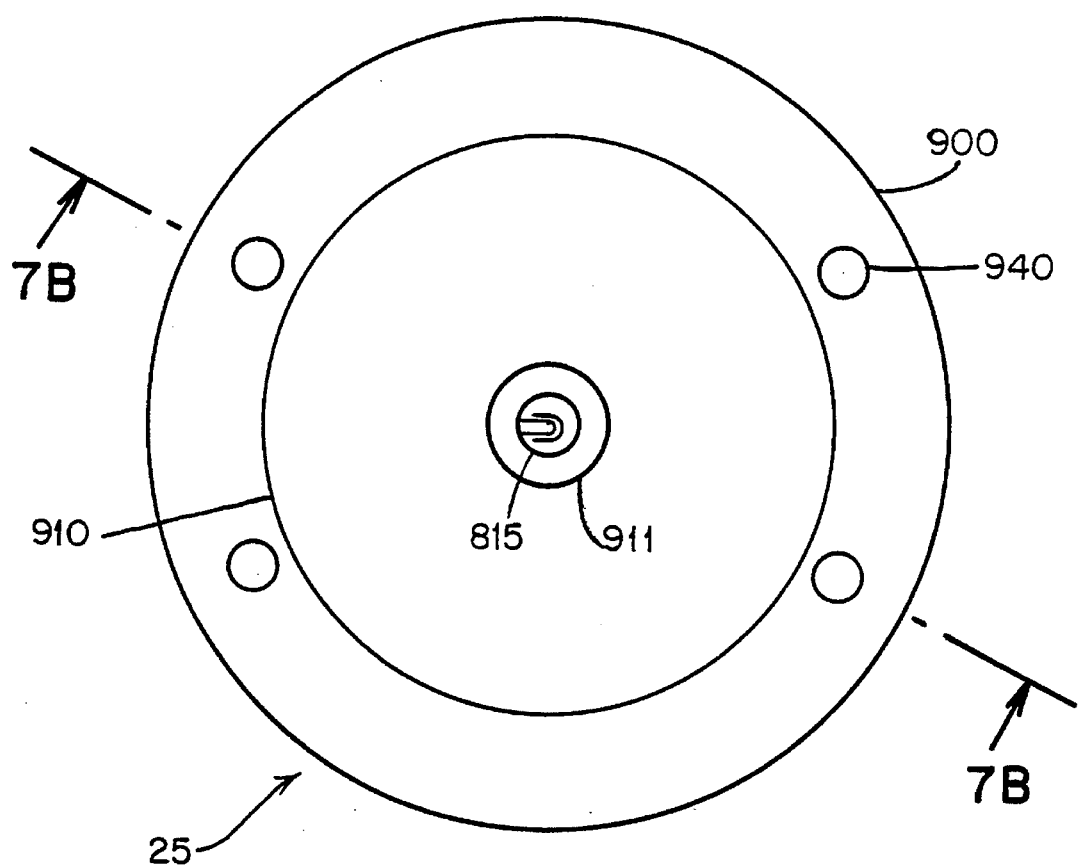
FIG. 7A is a top plan view of the strobe light assembly of the emergency locator device of the present invention.
Figure 7B:
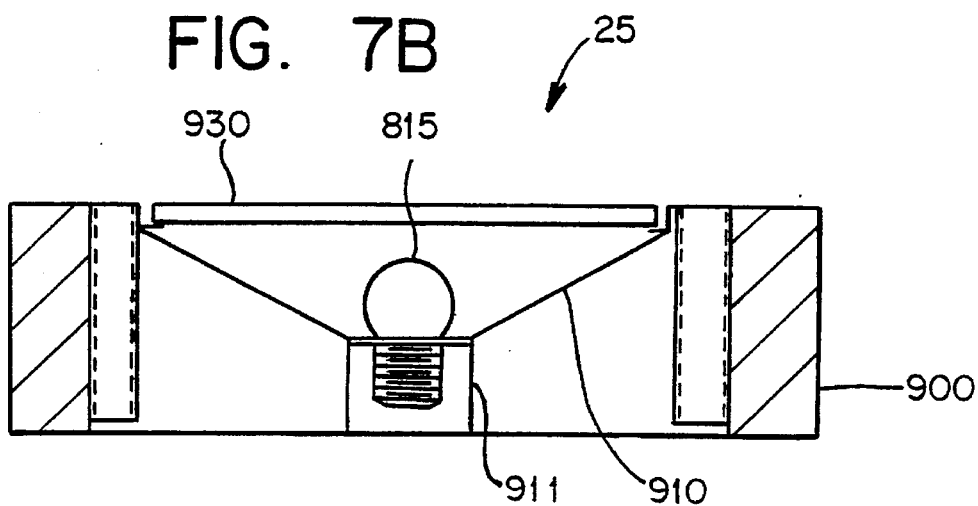
FIG. 7B is a cross-sectional view of the strobe light assembly shown in FIG. 7A taken along line 7B—7B.

As previously noted, the emergency locator device of the present invention includes one or more strobe light assemblies 25 (FIGS. 7A and 7B). The strobe light functions are controlled by a strobe light circuit 140 located on the main circuit board 55. The microcontroller 110 controls power to the strobe light circuit 140. The microcontroller is designed to energize the strobe light only during low-ambient lighting conditions (e.g., night). To activate the strobe light, the manual switch 45 is used, as will be further described in relation to FIG. 4C.

A more detailed description of the operation of the emergency locator device of the present invention is described herein with reference to FIGS. 1, 2, 3A–3F and 5. The emergency locator device functions in either a passive (no emergency signal being transmitted) or active (emergency signals being transmitted) mode. For illustrative purposes only, operation of the device having a manual switch 45 will be described in detail below. Placing the manual switch 45 in the "OFF" position enables the passive mode. When in this mode, a power supply voltage monitor (block 210), which forms part of the microcontroller 110, continuously monitors the amount of voltage available from the power supply, i.e., rechargeable battery or batteries 65. Referring to FIG. 5, if the battery voltage is above a preset minimum operational voltage, the microcontroller 110 will indicate a "BATTERY OK" message 770 on the display module 125. If the battery voltage is determined to be below a preset minimum operational voltage (defined as Vmin) (block 220), a "BATTERY LOW" (block 222) message 770 will be shown on the display module 125. An aural warning chirper 126 (block 225), which is mounted inside the environmentally sealed housing 80 but which may be heard through the housing, and which is electrically coupled to microcontroller 110, will also be activated to alert the operator of a low battery voltage condition. Under low battery conditions, the microcontroller 110 will not allow the emergency locator to receive and transmit satellite signals.

The emergency locator device is also equipped with a push-to-test (PTT) function which can be engaged when the device is in passive mode. When the PTT is activated (block 230), the microcontroller 110 conducts a system self-test (block 232) that checks the general operational condition of the device. If no fault is detected (block 234) by the microcontroller 110, a "SYSTEM OK" (block 236) message 780 (FIG. 5) is shown on the display module 60 and the device returns to the passive mode. If a fault is detected (block 234) by the microcontroller 110, a "SYSTEM FAIL - - - " (block 238) message 790 is shown on the display module 60. The fault message (block 234) includes a four digit hexadecimal code which identifies the nature of the fault. After a brief time interval, the emergency locator device returns to the passive, power supply voltage monitoring mode (block 210). The PTT function may be activated by using a third position on switch 45 or by using a separate PTT switch 46 mounted on the housing (FIGS. 1, 2 and 4C).

Figure 4A:
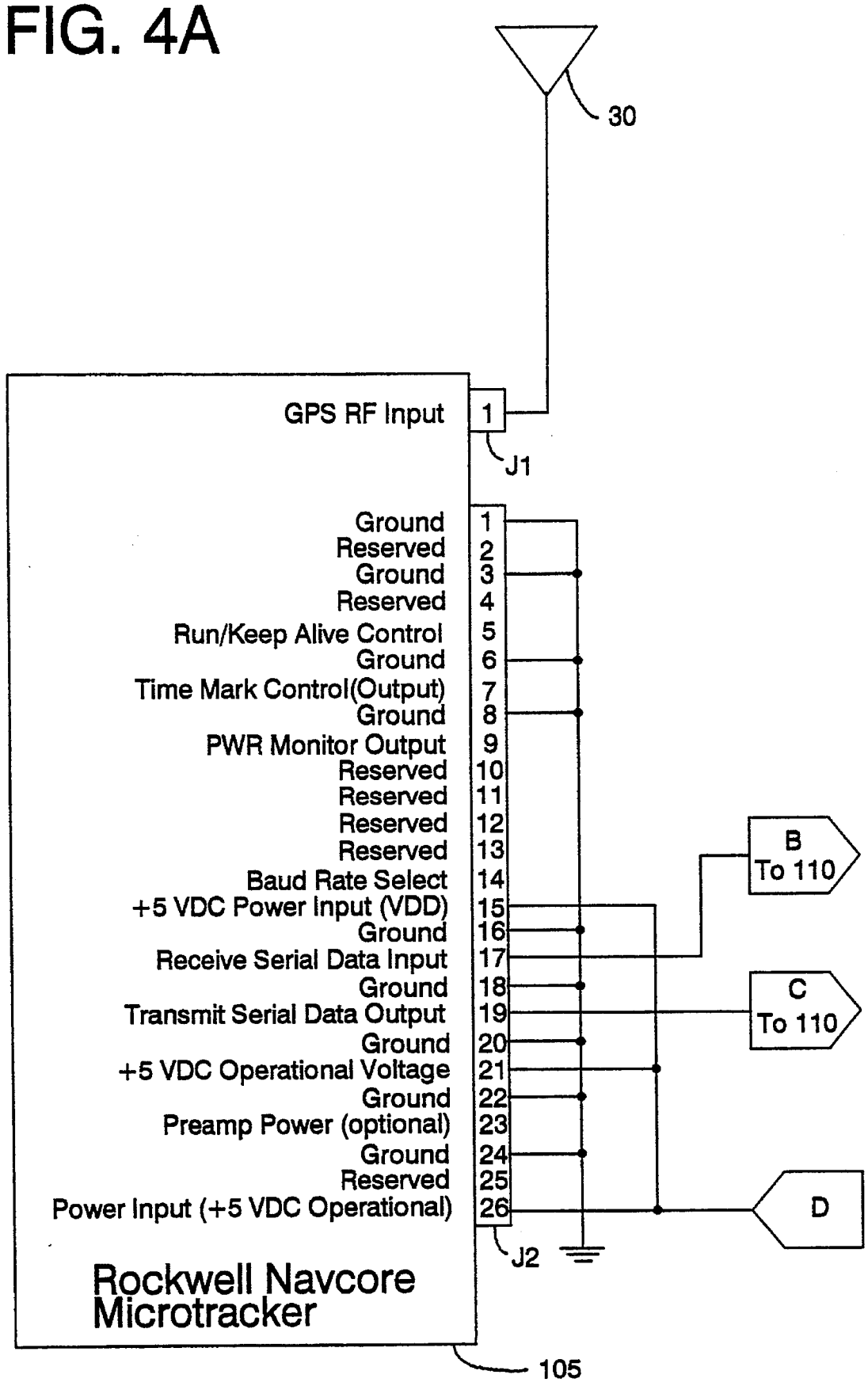
FIGS. 4A, 4B and 4C are portions of a schematic diagram of the internal electronic components of the emergency locator device of the present invention.
Figure 4B:
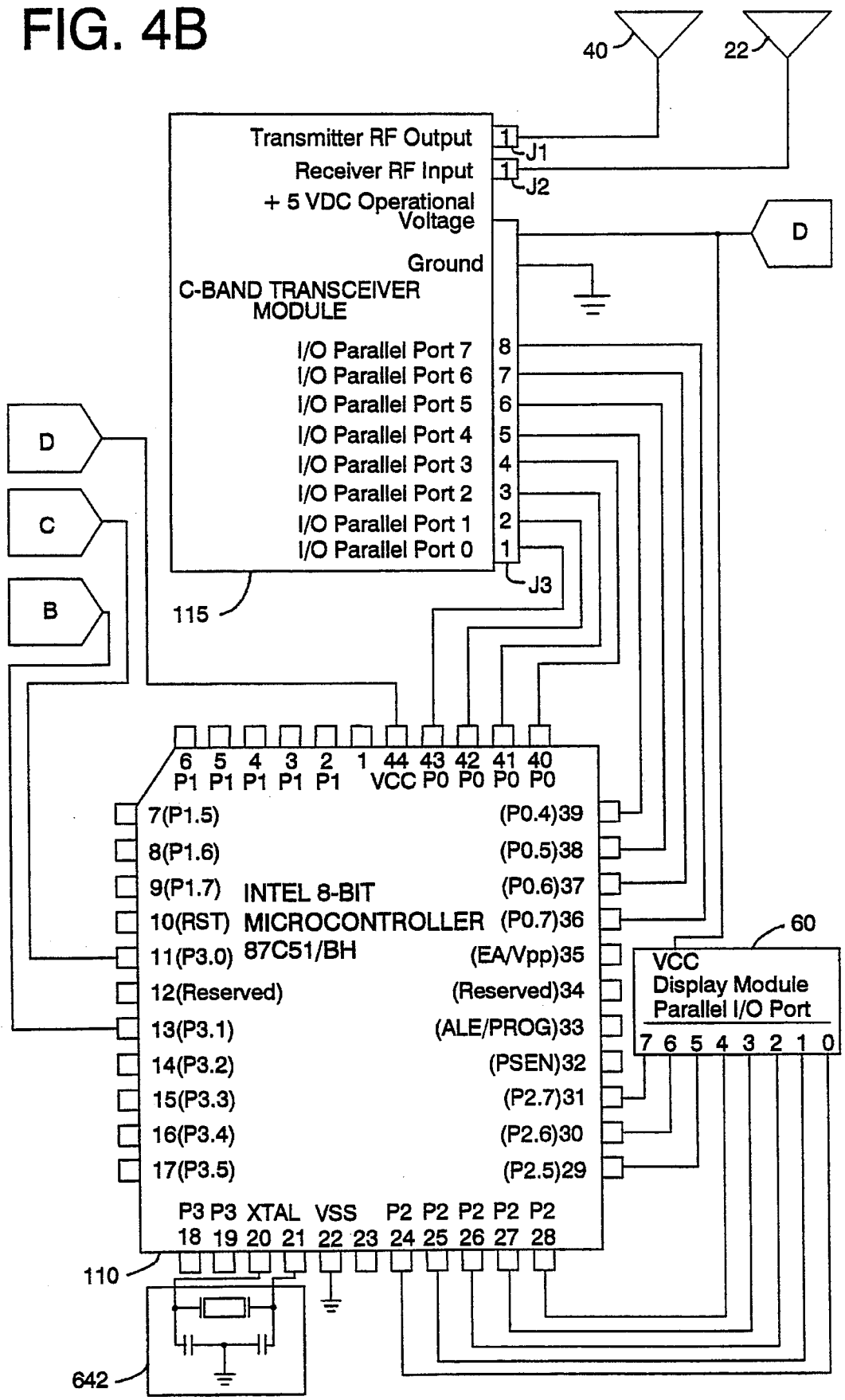
Figure 4C:
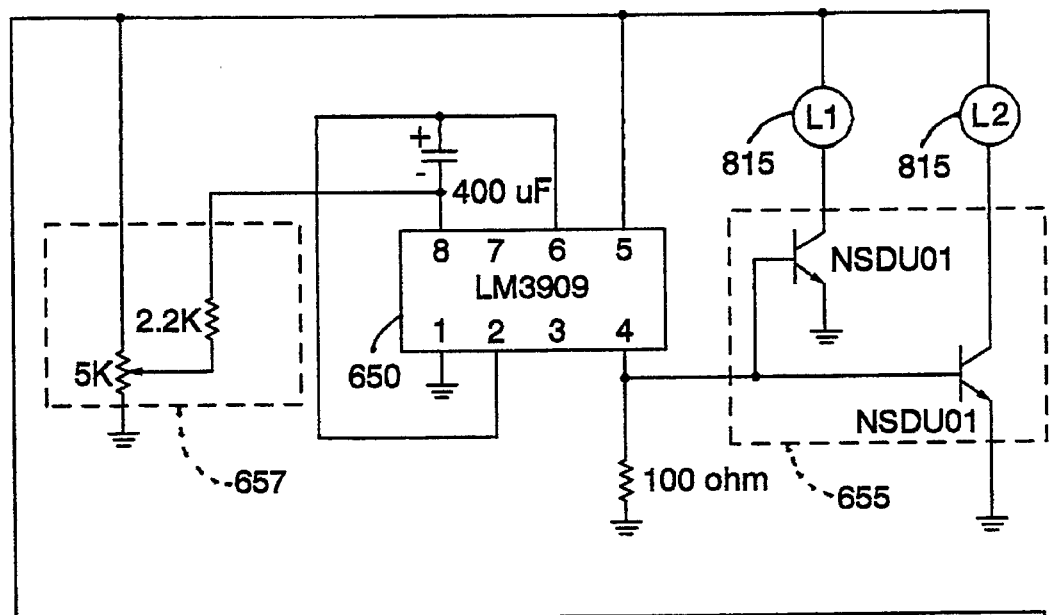
Figure 4C:
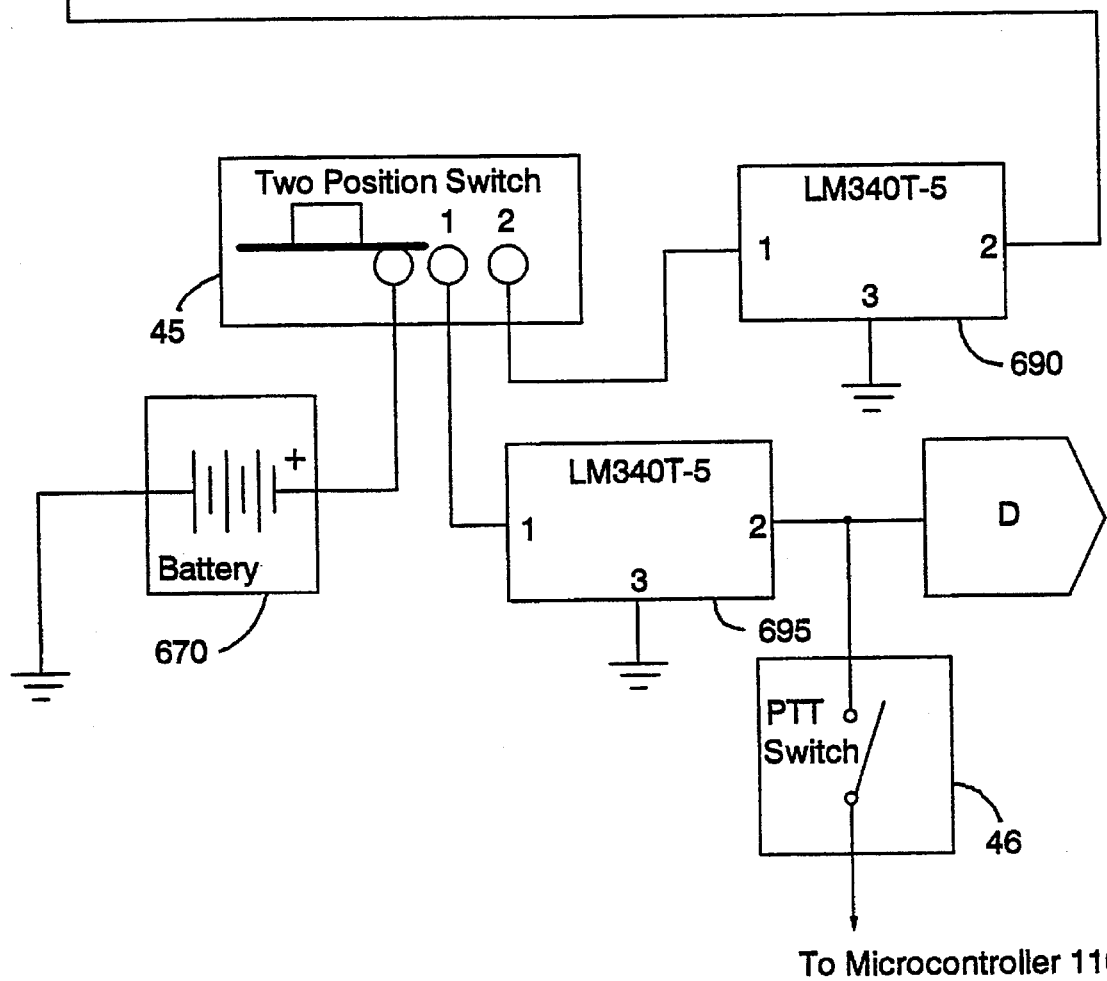

The emergency locator device active mode may be initiated by placing the manual switch 45 in the number "1" position (See FIG. 4C). After activation of the device (block 240), the microcontroller 110 causes the message " - - - ACTIVATED" 738 (FIG. 5) to be displayed (block 248) and initiates a preset time delay interval (block 250) that allows the operator time to turn off the unit in case of accidental activation of the device. The time delay interval (block 250) is designated "T1" and is measured in seconds. If the emergency locator device remains activated (block 260) after time interval "T1", microcontroller 110 conducts a system self-test (block 270) to determine an operational status of the device. This routine is the same as the system self-test routine (blocks 232–238) initiated when the PTT switch 46 is activated. If a fault is detected (block 280) by the microcontroller 110, a "SYSTEM FAIL - - - " (block 285) message 790 is shown on display module 125. As noted previously, the fault message (block 285) includes a four digit hexadecimal code which identifies the nature of the fault. If no fault is detected (block 280), a "SYSTEM OK" message (block 236) is displayed. The microcontroller 110 then conducts a power test 290 to verify that ample power is available from the battery supply 65. If the measured voltage is below a preset minimum operational voltage ("Vmin"), a "BATTERY LOW" message (block 295) is shown on the display module 60. A "BATTERY OK" message is displayed if the measured voltage is above the preset minimum operational voltage ("Vmin") requirement (block 292). The microcontroller 110 will not allow GPS receive and transmit modes to be initiated if the measured power is below the minimum operational voltage ("Vmin"). If the system self-test passes with no faults and the battery power is greater than Vmin, the microcontroller 110 initiates the GPS multi-satellite acquisition mode routine (block 300).

In the satellite acquisition mode, the GPS microtracker receiver/processor 105 scans the radio frequency spectrum to acquire four or more satellites which are required to determine the exact position of the device. GPS signals received by the downlink GPS receiving antenna 30 are routed to the GPS microtracker receiver/processor 105 for analysis and interpretation. The microcontroller 110 communicates with the GPS microtracker 105 at predetermined intervals to determine whether an adequate number of satellites (at least four) have been received (block 310) to determine a position fix. If the number of satellites is below the amount required, a "GPS ACQ NEGATIVE" (block 315) message 740 (FIG. 5) will be shown on the display module 60. The emergency locator device will remain in the GPS multi-satellite acquisition mode (block 300) until the minimum required number of satellites are received. If battery power drops below the preset minimum operational voltage ("Vmin") during this period (block 290), the device will not initiate further receive/transmit functions.

When a position has been calculated by the GPS microtracker 105 using an adequate number of GPS satellite signals, a "GPS ACQ GO" (block 320) message 740 is displayed on module 60 to the operator. Once a position is determined, longitude and latitude position coordinates which are calculated (block 330) by the GPS microtracker 105 are shown to the operator on the display module 60 (block 340). Geographic coordinates are identified on the display by "LAT" and "LONG" symbols, 710 and 720, respectively (FIG. 5). Coordinate numbers displayed are in degrees and correlate to the world geographic survey.

The longitude and latitude data is then transmitted from the GPS microtracker 105 to the microcontroller 110 which formats the uplink message (block 350). The formatted uplink message, i.e., the rescue message, includes both the unique identification number of the emergency locator device and the longitude and latitude coordinates. In order to send the rescue message, an uplink communications channel link must be established with an orbiting telecommunications satellite. This is referred to in the flow chart as the uplink satellite acquisition mode (block 360).

In the uplink satellite acquisition mode, the microcontroller 110 commands the C-band transceiver 115 to transmit an acquisition signal to a satellite to establish uplink communications. Such uplink communications are established by using microwave satellite receiving antenna 22 and data uplink transmitting antenna 40. A time delay programmed into the microcontroller 110 allows the C-band transceiver 115 several seconds to establish the uplink. If a satellite uplink is established (block 370), a message "UPLINK ACQ GO" 750 (block 380) will be shown on the display module 60 (FIG. 5). The formatted rescue message (longitude, latitude and identification number), stored in the microcontroller memory, is then routed to the C-band transceiver 115 for transmission (block 390) to the uplink satellite. The uplink transmitting antenna 40 is positioned on a top section of the emergency locator to send the uplink communications RF signal. The formatted rescue message is relayed by the communications satellite to a receiving ground station, at which point the message may be forwarded to rescue authorities using an established telephone communications network. After transmitting the formatted uplink message (block 390), the microcontroller 110 counts the number of times an uplink message has been transmitted by the emergency locator. A count bit (designated "T2") is set (block 400) every time a transmit message is sent during this activation period. This number is shown to the operator on the display module as "MSG (T2) TRANSMIT" 760 (FIG. 5) (block 410), where "T2" represents the number of times the uplink message has been transmitted. In this way, a person in distress can verify that the rescue message has actually been transmitted by the emergency locator device.

A time delay interval (block 420) (designated "T3") is initiated by the microcontroller 110 after each uplink message transmission. The delay allows the emergency locator device of the present invention to transmit the rescue message several times before returning the device to the GPS multi-satellite acquisition mode (block 300) for a position update. If an uplink satellite is not acquired (block 370) during the uplink satellite acquisition mode, the message "UPLINK ACQ NEGATIVE" 750 (block 372) is shown to the operator on the display module 60 (FIG. 5). The microcontroller 110 then initiates a programmed loop that will hold the emergency locator device in the uplink satellite acquisition mode (block 360) until either an uplink is established, or the number of cycles counted (designated "T4") has exceeded a preset limit. A count bit "T4" is iteratively reset (block 374) by the microcontroller 110 each time this mode is repeated. When count bit "T4" has reached a preset limit, the emergency locator returns to the power test (block 290) and the GPS multi-satellite acquisition mode (block 300) to refresh the longitude and latitude position data stored in the memory of the microcontroller 110. The cycle continues until all required satellites are acquired.

It is important to note that the entire GPS receive and message transmit cycle is preferably continuously repeated as long as the emergency locator device remains activated, has sufficient battery power and is acquiring satellites. This feature ensures that rescue authorities will receive periodic position updates from the emergency locator transmitting unit.

Referring now to FIGS. 4A–C, the preferred electronic components for the emergency locator device are shown. Electrical power is provided by a rechargeable battery 670 located in the power supply section 15. Manual positioning of a two position power switch 45 to the "ON" position (number "1" position) activates the device by completing an electrical circuit allowing current from the battery 670 to flow to a voltage regulator 695. The voltage regulator (LM340T-5) 695 provides a stable DC voltage output needed to power all the emergency locator electronics including the GPS microtracker 105 (preferably, a Rockwell Navcore Microtracker), a C-band transceiver 115, microcontroller 110 (INTEL 8-Bit Microcontroller 87C51/BH), the display module 60 and strobe light circuit 140 (including an LM 3909 integrated circuit). Although the embodiment described herein references a Rockwell Navcore Microtracker, other suitable GPS receiver circuit modules may be used with the present invention. For example, other suitable GPS receiver circuit modules include a Magnavox GPS Engine; Magellan AIV10GPS Receiver Module; and Japan Radio Co., Ltd. JRC GPS Receiver Core CCA-181.

Another voltage regulator 690, also preferably an LM340T-5 integrated circuit, regulates the DC voltage provided to the strobe light circuit 140, as will be described in greater detail, when the manual switch 45 is in position no. 2 (FIG. 4C) to activate the strobe light.

The downlink GPS receiving antenna 30 of the present invention is coupled to the GPS microtracker 105 and is designed to receive GPS signals in the 1–2 GHz frequency range. GPS signals which are received by downlink antenna 30 are routed to the GPS microtracker 105. The communications satellite receiving antenna 22 receives INMARSAT satellite signals, and these signals are routed to the C-band transceiver module 115. GPS signals are provided to the microtracker 105 and are processed to calculate the position of the emergency locator device. The emergency locator device's longitude and latitude data calculated by the microtracker 105 are digitally routed to the microcontroller 110 via a serial I/O data bus (microtracker pins 17 and 19).

The microcontroller 110 receives the output of the microtracker 105 at pins 11 and 13. The microcontroller coordinates all internal operational logic functions. An oscillator circuit 642 (utilizing an external quartz crystal) is coupled to pins 20 and 21 of the microcontroller 110 and enables the internal clock functions of the microcontroller. Position data received by the microcontroller is then formatted into an uplink message (preferably for transmission to an INMARSAT satellite). The uplink message is routed from pins 36–43 of the microcontroller 110 to a C-band transceiver module 115 via a parallel I/O data bus (pins 1–8 of connector J3 coupled to the transceiver 115). The C-band transceiver 115 transmits (via pin 1 of connector J1) the uplink message to the orbiting communications satellites within the 1–2 GHz frequency range using the uplink antenna 40 mounted on top of the unit.

As previously described with respect to FIGS. 3A–F, the emergency locator device operation status is continuously monitored by the microcontroller 110 and displayed (along with the latitude/longitude coordinates) to the user via the display module 60. Display data formatted by the 8-bit microcontroller 110 is provided to the display module 60 via a parallel I/O data bus coupled to pins 24–31 of the microcontroller.

Preferably, the strobe includes two separate flash tubes or lamps L1 and L2 which are mounted beneath a protective lens 930 on top of the device (FIG. 7B). In one embodiment of the present invention, the strobe lights are activated by placing the two-position switch 45 in the number "2" position. This allows current to flow from the battery 670 to DC power regulator 690 (LM340T-5). Regulated DC power is then routed to an oscillator circuit 650 (preferably, an LM3909 integrated circuit). The oscillator circuit 650 biases on and off a pair of NPN transistors (Part No. NSDU01) 655. When biased on, the transistors 655 provide a ground to the strobe lamps L1 and L2 allowing the lamps to illuminate. The rate of strobe lamp flashing may be adjusted using a rate adjust circuit 657 formed from a variable resistor coupled to the oscillator 650 and between the DC voltage and ground.

To activate the device, an operator moves the switch 45 located on the external housing to the number "1" position. Placement of switch in this position allows current to flow from the batteries 670 to the internal electronic modules. Slide switch position number "2" also activates the strobe light circuit in addition to powering all internal circuits.

Activation of the emergency locator device is indicated to the operator by the message " - - - ACTIVATED" 738 (FIG. 5) shown on display module 60. The blanks ('-') represent the unit identification number for the device. As previously noted, each unit is designed to include a unique number stored in its microcontroller 110 to assist rescue authorities in identifying the specific owner/operator of the device.

Referring to FIG. 5, a display module 60 for use with the emergency locator device is illustrated. The display module is preferably a liquid crystal display (LCD) having three sections. A first section 700 includes a display of the latitude 710 and longitude 720 (in degrees) of the emergency locator device. A second section 702 includes an indication of battery voltage and system status 770, 780, 790. A third section 730 includes an indication of additional operational status information such as an activation indication 738, satellite acquisition indications 740, 750 or an indication that a rescue signal has been transmitted 760.

Referring now to FIGS. 6, 7A and 7B, it may be seen that each strobe light assembly 25 includes strobe flash lamps 815. The strobe light assemblies 25 include a peripheral ring 900 having formed through the thickness thereof several holes or bores 940 for mounting each strobe light assembly using screws or other fasteners 31 to a mounting ring 29 of corresponding size (FIG. 1) secured within antenna mounting form 6. Similar rings 29 are used to secure the receiving antennas 22, 30 to the form 6 also by using screws or fasteners 31 (FIG. 1).

Each strobe light assembly 25 includes a reflector 910 which is mounted on an electrical base 911 into which the strobe lamps 815 are screwed and electrically connected. A protective transparent lens 930 is positioned over each reflector 910 and bulb 815 and forms a watertight seal with the reflector to protect the lamp 815 positioned in the base 911 from the environment.

As shown in FIG. 6, two strobe light assemblies 25 are positioned diametrically opposite one another and mounted in circular recesses in form 6 on the top portion of the emergency locator device and, similarly, the GPS receiving antenna 30 and microwave satellite receiving antenna 22 are positioned diametrically opposite one another also on the top portion of the locator device. The helical microwave satellite transmitting antenna 40 is surrounded by the strobe light assemblies 25 and receiving antennas 22, 30 and centrally located on the emergency locator device. With this arrangement, none of the various strobe light assemblies 25, receiving antennas 22, 30 and transmitting antenna 40 interferes with one another, and this arrangement provides an unobstructed communication link between the emergency locator device and the GPS and telecommunications satellites.

As mentioned previously, the emergency locator device of the present invention, if to be used at sea, preferably includes buoyancy means as shown in FIG. 1. The buoyancy means for the device is provided by forming a watertight buoyancy chamber 35 filled with air or a buoyant material, such as styrofoam. The antenna mounting form 6 may also be made from a lightweight, water resistant buoyant material, such as styrofoam. Materials that possess similar qualities to that of styrofoam may also be used for this purpose. Thus, when the emergency locator device of the present invention is placed in water, flotation is provided by the buoyancy means such that the antennas 22, 30, 40 and strobe lights 25 remain positioned above the surface of the water.

Since the emergency locator device of the present invention is sealed against the environment, the device may be immersed in water. Thus, the flotation means and environmentally sealed housing provide the device with the capability to either be released in an emergency to float on the water's surface, or released from below the surface of the ocean (e.g., from a diver or submarine) and the device will float to the water's surface to transmit the rescue signal. In such situations, a line attached to flange 70 will keep the emergency locator device in close proximity to the vessel or person in distress.

The emergency locator device of the present invention provides a portable, hand-held device which can accurately determine its location, and reliably transmit the location information to rescue authorities. The emergency locator device is a self-contained unit which performs a system check to ensure that all electronic components are operating properly. The emergency locator device of the present invention also provides a visual indication of the status of the system to the operator. Accordingly, a person in distress can be assured that a position has been determined, a communication link has been established and that a rescue message has been transmitted by the emergency locator device. Furthermore, the emergency locator device of the present invention is easy to use and relatively simple to manufacture.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An emergency locator device comprising:
   a housing, said housing being environmentally sealed and including an antenna section, an electronics section, and a power supply section, said housing having a vertical axis with upper and lower ends, said antenna section being located at said upper end;
   wherein said antenna section includes:
      a downlink receiving antenna;
      a communications uplink antenna arrangement including a microwave satellite transmitting antenna and a microwave satellite receiving antenna; and
      an antenna mounting form for providing buoyancy to said device, the downlink receiving antenna and the microwave satellite receiving antenna being mounted on the antenna mounting form, the transmitting antenna extending vertically from the antenna mounting form and being positioned at a higher level than the downlink receiving antenna and the microwave satellite receiving antenna, thereby providing an unobstructed line-of-sight to orbiting satellites, the downlink receiving antenna receiving information signals from global positioning satellites (GPS), the communications uplink antenna arrangement establishing a communications link with a telecommunications satellite, the buoyancy provided by the antenna mounting form causing the device to be self-righting in water, thereby maintaining the downlink receiving antenna and uplink antenna arrangement above the surface of the water; and
   wherein said electronics section includes:
      a main circuit board including means for determining a latitude and longitude of the emergency locator device in response to the received GPS information signals;
      means for transmitting the latitude and longitude information via the communications uplink antenna arrangement to the telecommunications satellite, the communications link established by the communications uplink antenna arrangement including transmission of said latitude and longitude information to and receipt of RF signals from said telecommunications satellite to verify establishment of said link; and
      display means for displaying desired information thereon.

2. An emergency locator device as defined in claim 1, wherein the antenna section further comprises a strobe light for providing visual indication of the emergency locator device in low-ambient lighting conditions.

3. An emergency locator device as defined in claim 1, wherein the antenna mounting form is environmentally sealed and mounted on the housing, the antenna mounting form and housing defining therebetween a water tight chamber to provide at least a portion of said buoyancy to the emergency locator device.

4. An emergency locator device as defined in claim 3, wherein the antenna mounting form is formed at least in part from a buoyant material, thereby providing at least a portion of said buoyancy to said device.

5. An emergency locator device as defined in claim 3, wherein the watertight chamber is at least partially filled with a buoyant material.

6. An emergency locator device as defined in claim 1, wherein each of the antenna section, the electronics section and the power supply section is individually environmentally sealed.

7. An emergency locator device as defined in claim 1, wherein the electronics section further includes a microcontroller to control the flow of data from the latitude and longitude determining means to the latitude and longitude information transmitting means.

8. An emergency locator device as defined in claim 7, wherein a unique identification number is stored in the microcontroller and is transmitted with the latitude and longitude information by the latitude and longitude information transmitting means.

9. An emergency locator device as defined in claim 1, wherein the latitude and longitude information transmitting means comprises a C-band transceiver coupled to the uplink antenna arrangement.

10. An emergency locator device as defined in claim 1, further comprising a power monitor to continuously monitor power provided to the main circuit board.

11. An emergency locator device as defined in claim 1, wherein the microwave satellite transmitting antenna is an axial-mode helix antenna.

12. An emergency locator device as defined in claim 1, wherein the antenna mounting form is formed at least in part from a buoyant material, thereby providing said buoyancy to said device.

13. An emergency locator device, which comprises:

a downlink satellite communications receiving antenna, the downlink receiving antenna providing an output signal in response to digital timing code signals transmitted from global positioning satellites (GPS);

a receiver/processor, the receiver/processor being responsive to the output signal from the downlink receiving antenna and generating a latitude and longitude information signal in response thereto, the latitude and longitude information signal defining the latitudinal and longitudinal coordinate location of the emergency locator device;

a microcontroller coupled to the receiver/processor and controlling the operation thereof, the microcontroller having a memory for storing therein rescue information data, the rescue information data including data corresponding to the latitude and longitude information signal from the receiver/processor, the microcontroller generating an output signal corresponding to the rescue information data stored in the memory;

a transceiver, the transceiver being coupled to the microcontroller and controlled thereby, the transceiver being responsive to the output signal from the microcontroller, the transceiver generating a rescue signal;

an uplink satellite communications transmitting antenna, the uplink transmitting antenna being responsive to the rescue signal from the transceiver and transmitting the rescue signal to a telecommunications satellite;

an uplink satellite communications receiving antenna, the uplink receiving antenna receiving RF signals from said telecommunications satellite to verify establishment of a communications link therewith;

an environmentally sealed housing including an antenna section, the housing having mounted therein the receiver/processor, the microcontroller and the transceiver, the housing having a vertical axis with upper and lower ends, the antenna section being located at the upper end of the housing; and an antenna mounting form for providing buoyancy to said device, the form being located on the antenna section at the upper end of the housing, the downlink receiving antenna and the uplink satellite receiving antenna being mounted on the antenna mounting form, the transmitting antenna extending vertically from the antenna mounting form and being positioned at a higher level than the downlink receiving antenna and the uplink satellite receiving antenna, thereby providing an unobstructed line-of-sight to orbiting satellites, the buoyancy provided by the antenna mounting form causing the device to be self-righting in water, thereby maintaining the downlink receiving antenna, the uplink receiving antenna and the uplink transmitting antenna above the surface of the water.

14. An emergency locator device as defined in claim 13, further comprising a power supply for providing power to the receiver/processor, microcontroller and transceiver, the power supply having substantial mass and being situated near the lower end of the housing opposite from the upper end where the antenna mounting form is situated to provide the emergency locator device with a low center of gravity and stability when the emergency locator device is immersed in water.

15. An emergency locator device as defined in claim 13, wherein the housing includes means for attaching a line.

16. An emergency locator device as defined in claim 14, further comprising a voltage monitor to continuously monitor the power supply voltage and provide an indication of low voltage.

17. An emergency locator device as defined in claim 13, further comprising a strobe light for providing visual indication of the emergency locator device in low-ambient lighting conditions.

18. An emergency locator device as defined in claim 13, which further comprises display means coupled to the microcontroller for displaying latitude and longitudinal information to an operator.

19. An emergency locator device as defined in claim 13, wherein the microcontroller includes a system status determination means to determine system operability; and wherein the emergency locator device further comprises display means for displaying system status information to an operator, the display means being coupled to the microcontroller.

* * * * *